L. P. NORTON.
COMBINATION VOLTMETER, AMMETER, AND PNEUMATIC PRESSURE GAGE.
APPLICATION FILED OCT. 7, 1909.
998,115.
Patented July 18, 1911.
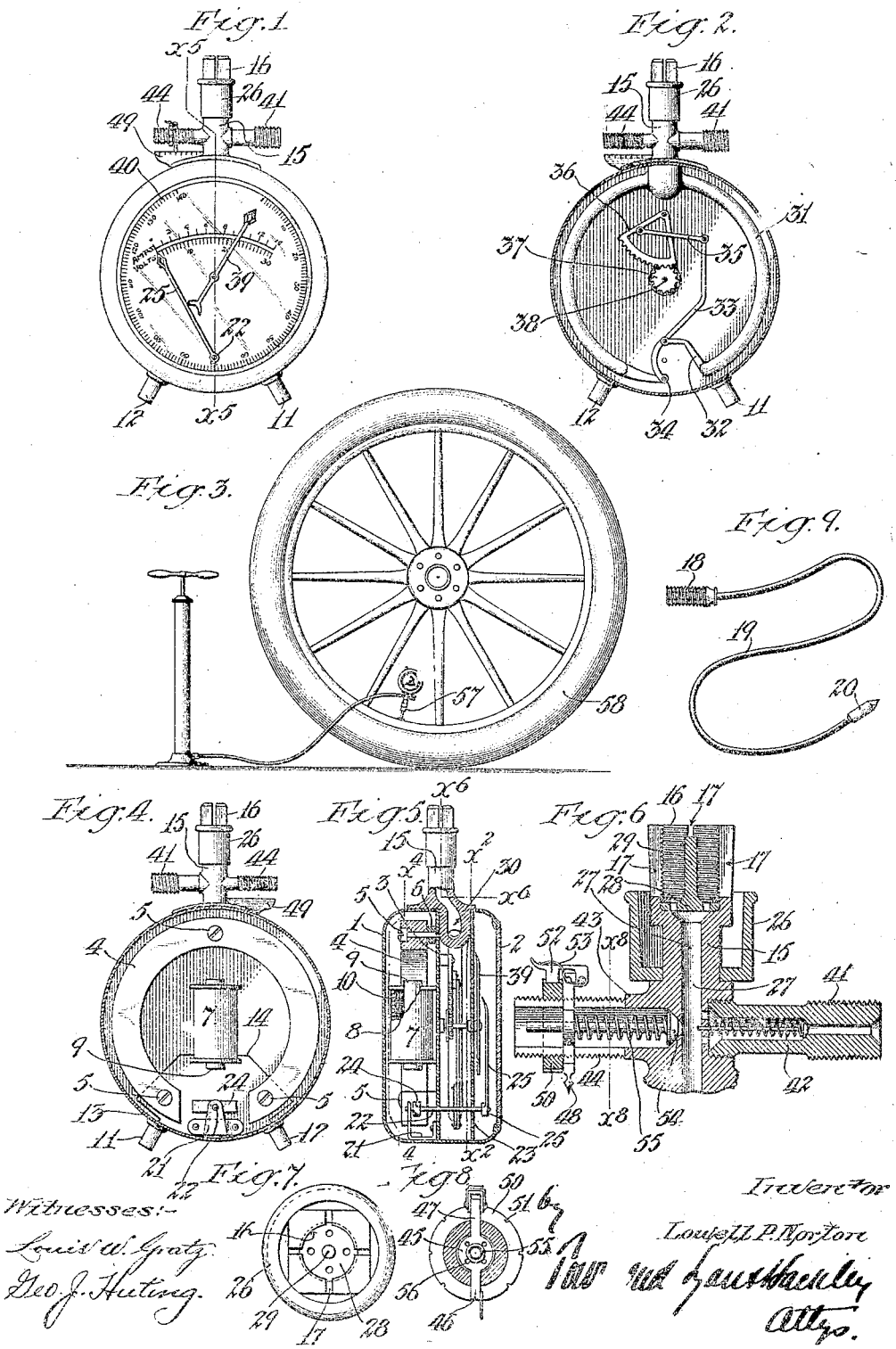

UNITED STATES PATENT OFFICE.

LOWELL P. NORTON, OF LOS ANGELES, CALIFORNIA, ASSIGNOR OF ONE-HALF TO EUGENE HOORNBEEK, OF LOS ANGELES, CALIFORNIA.

COMBINATION VOLTMETER, AMMETER, AND PNEUMATIC PRESSURE-GAGE.

998,115.  Specification of Letters Patent.  Patented July 18, 1911.

Application filed October 7, 1909. Serial No. 521,642.

*To all whom it may concern:*

Be it known that I, LOWELL P. NORTON, a citizen of the United States, residing at Los Angeles, in the county of Los Angeles and State of California, have invented a new and useful Combination Voltmeter, Ammeter, and Pneumatic Pressure-Gage, of which the following is a specification.

This invention relates to a combination instrument, designed particularly for the use of automobilists, by means of which the voltage or amperage of the electric batteries may be determined, or the pressure of air in the tire may be determined, and the principal object of the invention is to associate the devices into such interrelation that a single, compact instrument is produced with which any of these functions may be performed. This interrelation of parts produces a co-action of the elements such that certain elements are common to each device, whereas, where the devices are constructed independently of each other, those elements would be individually required in each device; whereas, in the present combination and interrelation certain elements act in common for different functions and thereby many parts are eliminated without sacrificing any of the advantages possessed by the devices as heretofore individually constructed.

A further object is to provide an instrument of this character which can be attached as an intermediate fitting between the air pump and the tire to accurately register the pressure of air in the tire during the inflation of the tire.

A further object is to provide automatic valve means which prevents escape of air from the device when it is employed as a pressure gage without the pump being attached.

A further object is to provide valve means operating automatically to prevent the tire from being inflated above a predetermined pressure and to provide means whereby such valve mechanism may be regulated to automatically act at any pressure desired.

Further objects and advantages relate to details of construction and operation which will be brought out in the following description.

Referring to the drawings: Figure 1 is a plan view of the instrument. Fig. 2 is a section on line $x^2$—$x^2$ Fig. 5. Fig. 3 is a side elevation of the device showing it applied to a tire in position for indicating the pressure during inflation. Fig. 4 is a section on line $x^4$—$x^4$ Fig. 5. Fig. 5 is a section on line $x^5$—$x^5$ Fig. 1. Fig. 6 is an enlarged section on line $x^6$—$x^6$ Fig. 5. Fig. 7 is a plan view of the threaded split socket. Fig. 8 is a section on line $x^8$—$x^8$ Fig. 6. Fig. 9 is a plan view of the extension cord.

1 designates the case of the instrument which is preferably of pressed steel and provided with a glass face 2. Within the case 1 is a partition 3 to which is secured a permanent horseshoe magnet 4, being secured by screws 5 and separated from the partition 3 by blocks of insulation 6.

7 is an electromagnet having turns of fine wire 8 wound on a core 9 and turns of heavy wire 10 wound over the fine wire 8.

11 and 12 are terminals which project from the case 1 and are insulated therefrom, the terminal 11 being connected by a wire 13 with the heavy wire 10 and the terminal 12 being connected by a wire 14 with the fine wire 8. The terminal 12 is employed for indicating voltage and the terminal 11 is employed for indicating amperage. The other ends of wires 8 and 10 are grounded on the metal partition 3.

A stem 15 is connected to the case 1 and is in contact with the partition 3 and forms the ground connection or opposite pole to either the terminal 11 or 12, so that when the stem 15 and the terminal 12 are connected to the opposite poles of a battery, the circuit will be completed through the fine wire 8; while, when the terminal 11 and the stem 15 are connected to the opposite poles of a battery, the circuit will be through the large wire 10. The stem 15 has an internally threaded end 16 which is slotted at 17, and a threaded extension 18 is adapted to be screwed to the end 16, there being a flexible cable 19 connected to the extension 18 and provided with a contact terminal 20 adapted for application to one of the poles of the battery to be tested.

21 is a bracket within the case 1 in which one end of a shaft 22 is pivoted, the shaft 22 also being journaled in the partition 3 and passing through a dial 23. Fixed on the shaft 22 is an armature 24 which lies horizontally between the poles of the horseshoe magnet in its magnetic field when the instrument is not in use. A hand 25 is secured to the shaft 22 and is adapted to move over two rows of graduations, the upper row being designated "Amps" and the lower one being designated "Volts".

When an electrical circuit is formed through the fine wire 8 by bringing terminal 12 into contact with one pole of the battery and the stem 15, through cable 19 and terminal 20, in contact with the other pole of the battery, the magnet 7 is correspondingly energized and produces a magnetic field which acts upon the armature 24 modifying to a certain extent the action of the horseshoe magnet 4 upon the armature 24 and the latter turns and in turning rotates the shaft 22 and swings the hand 25 over the graduations indicating the amount of voltage. When the terminals 11 and 20 are connected to the opposite poles of the battery, the magnet 7 is energized by the large wire 10 and the magnetic field thus produced actuates the armature 24 a corresponding amount modifying the influence of the horseshoe magnet 4 and the hand 25 is moved over the graduations and indicates the number of amperes passing through the circuit. In either case, as soon as the circuit is broken through either the terminal 11 or 12 the influence of the horseshoe magnet 4 at once restores the armature 24 into neutral position with the hand 25 resting at zero.

The split socket 16 which is formed on the stem 15 is squared on the outside, and tapered as shown in Fig. 6, and a collar 26 which is slidable on the stem 15 is internally tapered and adapted to be slid up over the squared socket and bear against it at four points only, thus enabling the socket to be slipped over the threaded valve and then clamped thereto by sliding up the collar which wedges in the split collar tightly against the valve threads. The stem 15 has a central air passage 27, in the mouth of which is a preforated plate 28, from the center of which projects a pin 29, the latter being adapted for depressing the valve pin of the tire when the instrument is secured to the tire. The passage 27 leads to a chamber 30, as shown in Fig. 5, which communicates with the center portion of a curved tube 31, the free ends of the tube being movable toward and from each other as the tube 31 expands or contracts, according to the air pressure within it. Secured to one end of the tube 31 is an arm 32 which is pivotally connected to a lever 33, the latter being pivoted at 34 to the other arm of the tube 31. A link 35 connects the upper end of the lever 33 with a segmental gear 36 which meshes with a pinion 37 on a shaft 38. The shaft 38 extends through the dial 23 and carries a hand 39 which is movable over graduations 40 for indicating the air pressure within the tube 31.

A branch 41 is screwed into the side of the stem 15 and is provided with an inwardly yielding check valve 42 which permits air to be forced through the branch 41 into the passage 27, but prevents air from passing outwardly. A branch 43 extends from the opposite side of the stem 15 and is provided with two slots 44. Slidable within the branch 43 is a plunger 45 having arms 46 and 47 which are slidable in the slots 44. The arm 46 carries a pointer 48 which is movable over a scale 49, as shown in Fig. 1. The branch 43 is externally threaded and screwed thereon is a nut 50 having notches 51 in its periphery and pivoted to the arm 47 is a detent 52 which is adapted to engage in any of the notches 51 and be yieldingly held in engagement therewith by a spring 53.

A release valve 54 is arranged within the branch 43 and a coil spring 55 is arranged between the valve 54 and the plunger 45. The plunger 45 is provided with perforations 56. The tension on the spring 55 may be regulated by turning the nut 50 and the latter may be turned by lifting the detent 52 out of engagement with the notch 51. After the proper tension of spring 55 has been secured, the detent 52 may be reëngaged with the notch 51 and the nut 50. The scale 49 will indicate the position of the hand 48 and thus enables the tension of spring 55 to be regulated to permit the valve 54 to open when the pressure of air within the passage 27 is a certain amount. Thus when the instrument is applied to the valve 57 of the tire 58, as shown in Fig. 3, and air is forced through the branch 41, thence into the passage 27 and thence through the valve 57 into the tire 58, the inflation will proceed until the pressure is sufficient to overcome the spring 55, whereupon the valve 54 will open and permit the excess of compressed air to escape through the perforations 56, thus automatically preventing the tire from being inflated above the desired pressure. Should the device be applied to the valve 57 of the tire to merely determine the pressure, the valve 42 will remain closed as the pressure within the passage 27 tends to hold it closed. Obviously, when the instrument is applied, as shown in Fig. 3, and air is being forced through the branch 41, the compressed air is in direct communication with the tube 31 during the inflation, and thus the pressure is constantly under observation.

What I claim is:

1. A case, electrical indicating devices therein including their dial and hand, an air pressure operated device therein, said dial having graduations denoting air pressure, a hand operated by the air pressure device and movable over the said graduations, a stem on the case in communication with the air pressure device and in electrical connection with the electrical indicating device, a cable with a threaded extension screwed in said stem, said cable having a tip, and two terminals projecting from the case and electrically connected with the respective electrical indicating devices.

2. A case, electrical indicating means therein, pneumatic pressure indicating means in the case, a stem on the case, an electrical connecting means, said stem being of conducting material and being in connection with said electrical indicating means and being formed with an interior channel in communication with the pneumatic pressure indicating means, and said stem being formed with a socket communicating with said channel in the stem and adapted to receive and contact with said electrical connecting means and also adapted to receive and communicate with pneumatic connecting means to establish communication from said pneumatic connecting means through said channel to the said pneumatic pressure indicating means, and another contact means in said case in communication with said electrical indicating means for completing the connection to a circuit.

3. A case, electrical indicating means therein, pneumatic pressure indicating means in the case, a stem on the case, an electrical connecting means, said stem being of conducting material and being in connection with said electrical indicating means and being formed with an interior channel in communication with the pneumatic pressure indicating means, and said stem being formed with a socket communicating with said channel in the stem and adapted to receive and contact with said electrical connecting means and also adapted to receive and communicate with pneumatic connecting means to establish communication from said pneumatic connecting means through said channel to the said pneumatic pressure indicating means, said socket being internally screw threaded to engage the aforesaid connecting means, and another contact means in said case in communication with said electrical indicating means for completing the connection to a circuit.

In testimony whereof, I have hereunto set my hand at Los Angeles, California, this 1st day of October, 1909.

LOWELL P. NORTON.

In presence of—
G. T. HACKLEY,
FRANK L. A. GRAHAM.